Oct. 10, 1950  C. C. FUERST  2,524,786
DIRECT-ACTING SHUTTER FOR CAMERAS
Filed Feb. 14, 1947  3 Sheets-Sheet 1
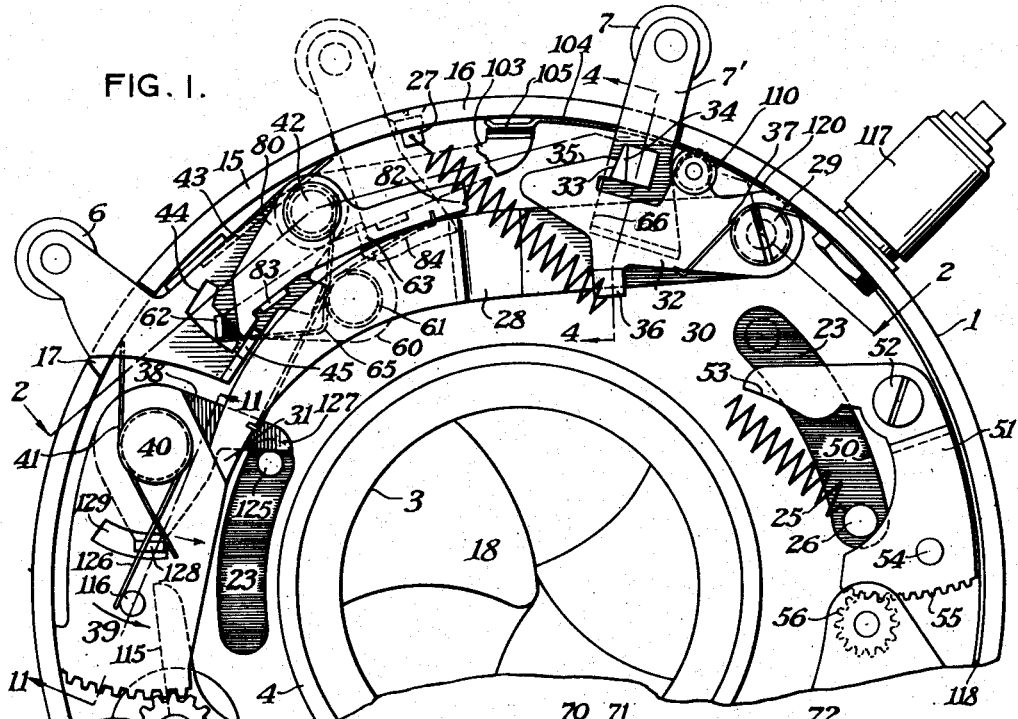
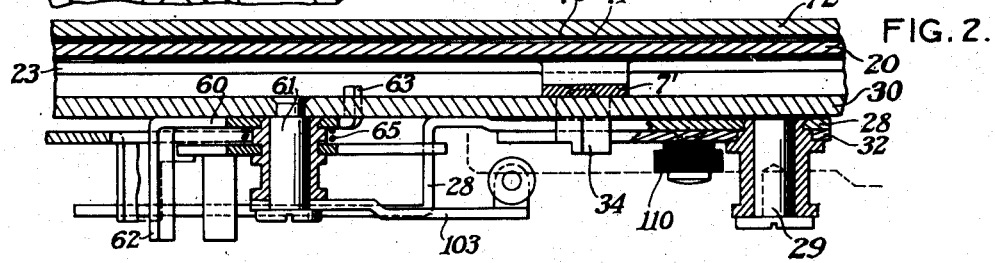
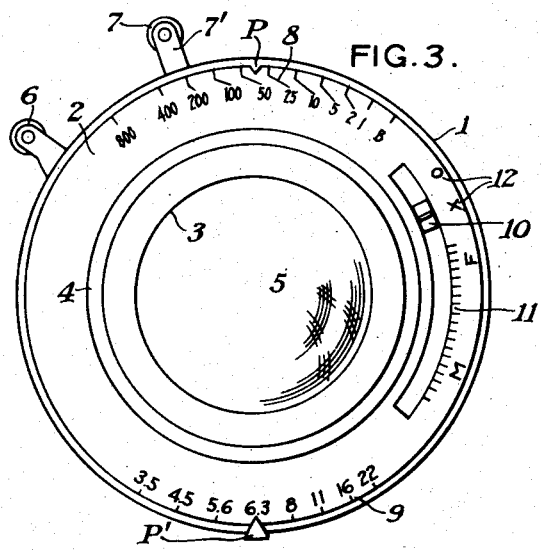
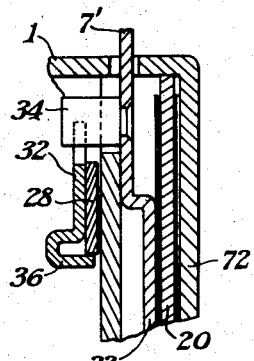
CARL C. FUERST
INVENTOR
BY
ATTORNEYS Oct. 10, 1950     C. C. FUERST     2,524,786
DIRECT-ACTING SHUTTER FOR CAMERAS
Filed Feb. 14, 1947     3 Sheets-Sheet 2
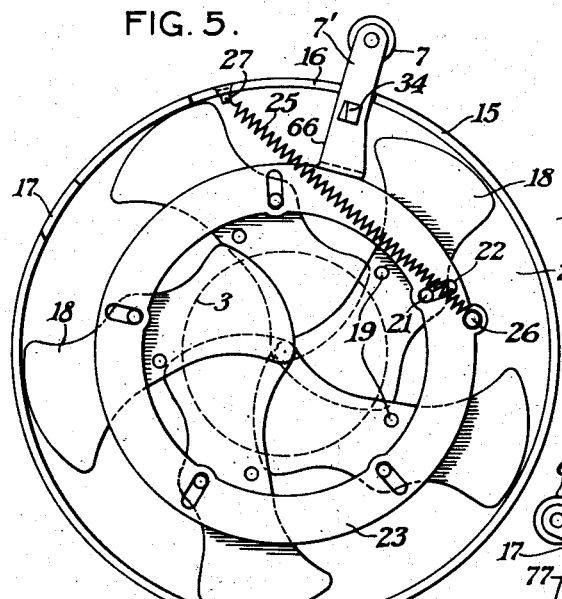
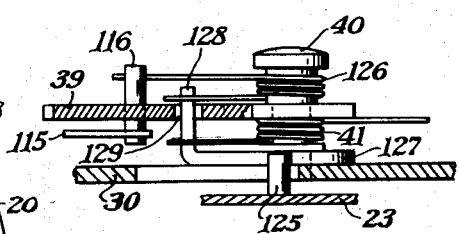
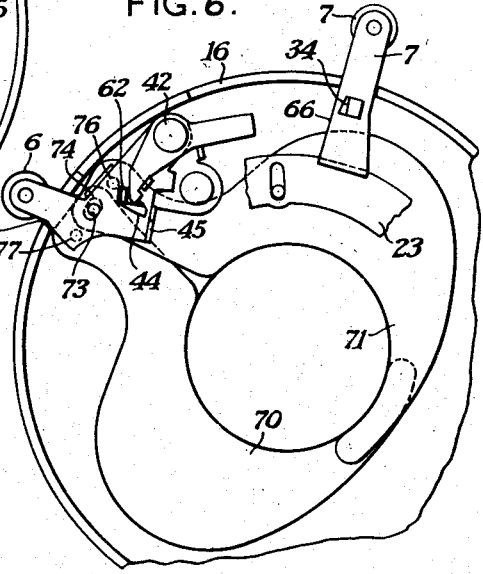
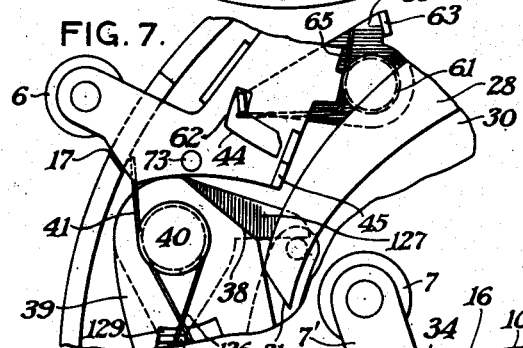
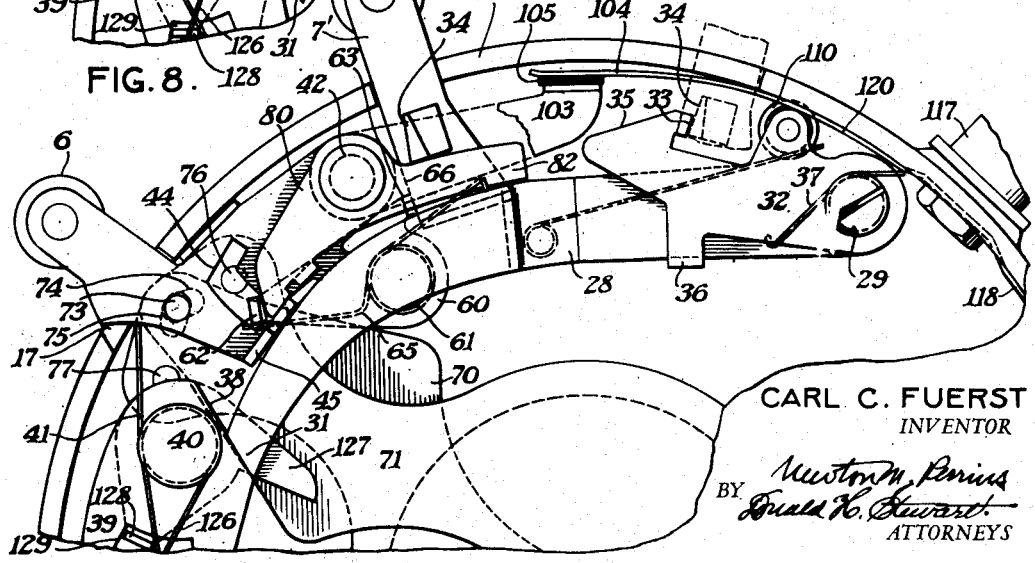
CARL C. FUERST
INVENTOR
ATTORNEYS Oct. 10, 1950     C. C. FUERST     2,524,786
DIRECT-ACTING SHUTTER FOR CAMERAS
Filed Feb. 14, 1947     3 Sheets-Sheet 3
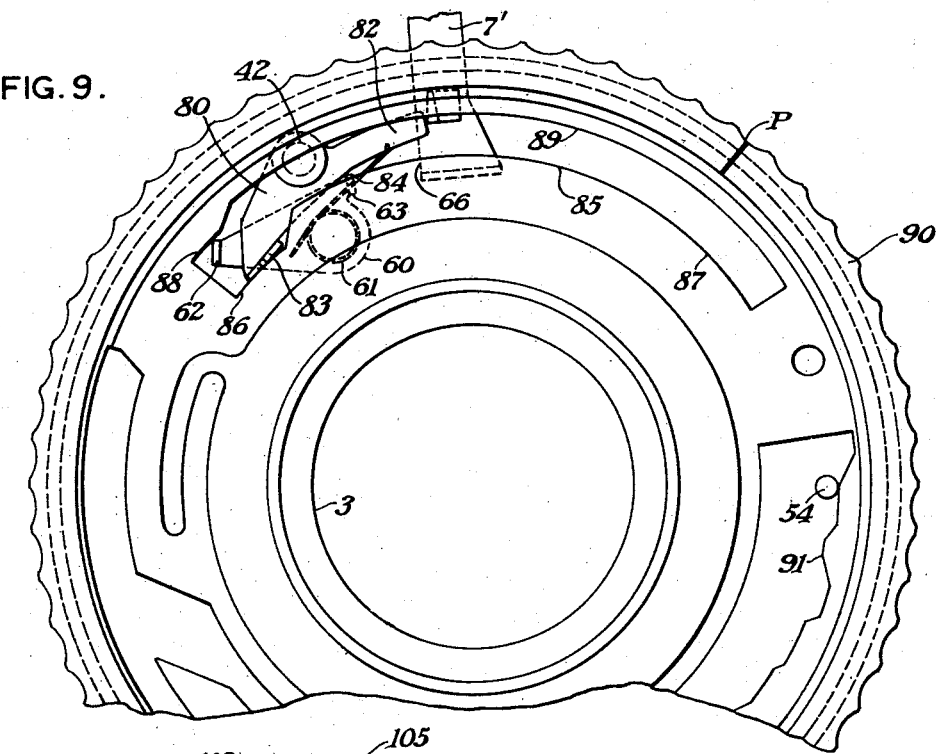
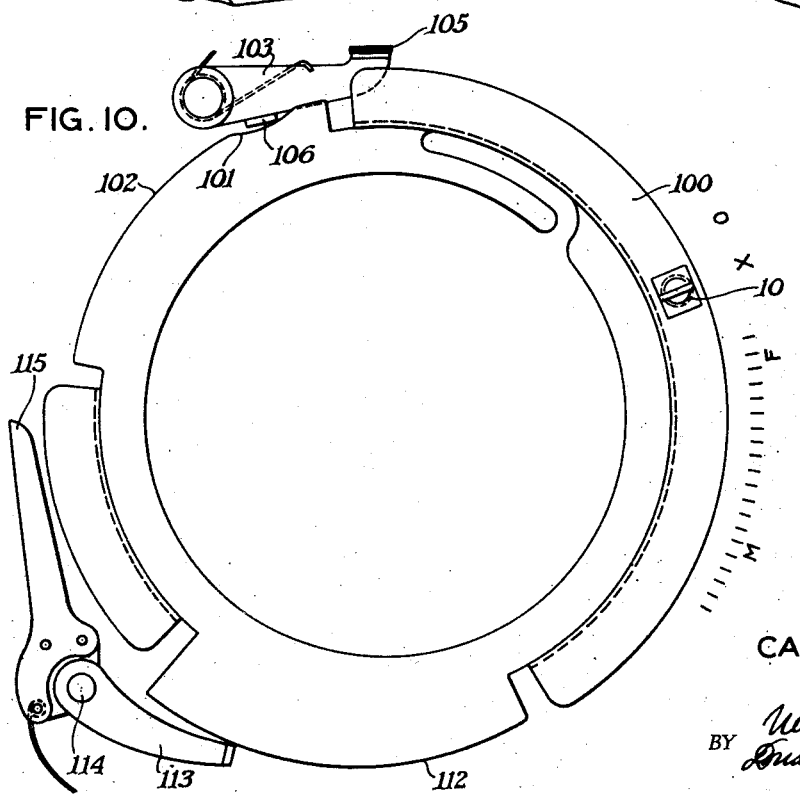
CARL C. FUERST
INVENTOR
BY
ATTORNEYS Patented Oct. 10, 1950

2,524,786

UNITED STATES PATENT OFFICE 2,524,786

DIRECT-ACTING SHUTTER FOR CAMERAS

Carl C. Fuerst, Rochester, N. Y., assignor to Eastman Kodak Company, Rochester, N. Y., a corporation of New Jersey Application February 14, 1947, Serial No. 728,528

17 Claims. (Cl. 95—63)

This invention relates to photography and particularly to setting shutters for cameras. One object of my invention is to provide a direct acting shutter; that is, a shutter in which the parts are so arranged that many of the intermediate parts, usually used in shutter construction, have been omitted, thereby materially reducing the number of movable parts. Another object of my invention is to provide a shutter capable of making a high-speed exposure, the blades being of the symmetrical type which open and close an exposure aperture while the blade ring is moving in one direction. Another object of my invention is to provide a means for covering the exposure aperture with supplementary blades during the setting movement of the shutter and to have these supplementary blades directly acted upon by the shutter-operating lever, generally known as a trigger. A still further object of my invention is to provide a shutter in which the releasing movement can be accomplished with only extremely slight pressure on the trigger and in which a part of the shutter-releasing mechanism is operated by power. Other objects will appear from the following specification, the novel features being particularly pointed out in the claims at the end thereof.

It has been common practice in photographic shutters to provide a master member which is ordinarily an oscillating ring or disk to which a power spring is connected, the rotating ring or disk carrying a means for striking and moving a blade ring to open and close shutter blades. Such master members have been considered more or less necessary by shutter designers because it was thought that such master members were necessary in order to provide the quick opening and closing movements of the shutter blades, such as have been desirable for high-speed shutters. However, the master members always required additional and intermediate parts and added to the inertia of the shutter and likewise required a chain of operating parts to produce the required shutter blade movement. I have found that by reducing the number of parts as much as possible and by acting directly on the members to be moved that not only can many shutter parts be eliminated, but that high speeds can be obtained without the usual intermediate parts.

Reference may be made to Patent No. 2,232,969, Ranft, granted February 25, 1941, for a shutter having two sets of shutter blades. Here, the blades are to prevent light leak through the main shutter blades. These are not used in setting the shutter and there are other material differences from the shutter of this application. My present shutter may be considered as an improvement over certain features of Ranft.

Coming now to the drawings wherein like reference characters denote like parts throughout:

Fig. 1 is a fragmentary front elevation of a shutter with the shutter cover removed showing a preferred embodiment of my invention;

Fig. 2 is an enlarged fragmentary section taken on line 2—2 of Fig. 1;

Fig. 3 is a front plan view of the shutter on a somewhat reduced scale from the preceding views showing the shutter cover and shutter speed adjusting mechanisms;

Fig. 4 is a fragmentary sectional view taken on line 4—4 of Fig. 1;

Fig. 5 is a plan view showing the shutter-operating ring and power spring therefor;

Fig. 6 is a view showing a portion of the shutter and particularly the supplementary aperture cover blades and their relation to the shutter trigger;

Fig. 7 is a fragmentary detail view of some of the parts shown in Fig. 1 but with the trigger in a depressed or shutter-releasing position;

Fig. 8 is a fragmentary view similar to Fig. 1 but with the shutter parts in the position they assume after an exposure has been made;

Fig. 9 is a fragmentary plan view of the setting cam ring and several associated parts;

Fig. 10 is a plan view of the flash synchronizing ring with several associated levers; and Fig. 11 is a fragmentary section on line 11—11 of Fig. 1.

As indicated in Fig. 3, my shutter may consist of an annular casing 1 having a shutter cover plate 2 surrounding a central exposure aperture 3 and may contain the usual threaded flanges 4 into which a front lens element 5 may be screwed in the usual manner. The shutter is preferably provided with a trigger 6 for releasing the shutter and a setting lever 7 for tensioning the operating spring. The shutter cover 2 may contain a speed scale 8 with its pointer P and a diaphragm scale 9 with its pointer P' and, in addition, if the shutter is equipped with a flash synchronizer, it may be provided with a setting lever 10 for adjusting the synchronizer for instantaneous types of flashes or flashes in which lamps having various millisecond delays are used. The scales 11 and 12 indicate the particular type of flash for which the shutter is synchronized.

As indicated in Fig. 1, the annular shutter casing may include an upstanding flange 15 extending around the periphery of the shutter, this flange having a slot 16 formed in the flange to permit the movement of the setting lever 7 and having a slot 17 permitting movement of the trigger 6 for releasing the shutter mechanism.

Referring to Fig. 5, the shutter blades 18 are here shown as being of a symmetrical type, each blade 18 being pivoted at 19 to the mechanism plate 20 and each blade having an upstanding pin 21 entering a slot 22 in a movable blade ring 23. This blade ring directly carries an arm 7' which terminates in setting handle 7 and extends out through the slot 16 in the shutter flange 15. A power spring 25 is connected directly to the blade ring 23 by a pin 26 and is connected to a stud 27 carried by the shutter casing at its opposite end. Thus, the spring 25 acts directly on the blade ring 23 and it becomes tensioned when the setting lever 7 is moved to the Fig. 5 and to the Fig. 1 positions.

As indicated in the Fig. 1 position, the blade ring is held with the spring tensioned by means of a latch mechanism which consists of a first latch member 28 pivoted on the stud 29 attached to the mechanism plate 30. The latch 28 has a beveled end 31 and extends across the top of the shutter, this latch member lying beneath a second latch member 32 also pivoted on the stud 29. Latch 32 has a latch face 33 adapted to engage an outwardly-projecting protuberance 34 on the setting lever 7'. This latch therefore holds the setting lever in its set position when the lug 34 moves up over the incline 35 of the second latch member as the handle 7 is moved to a set position. A downwardly-extending flange 36 limits the upward movement of the second latch 32 under the impulse of its spring 37, but it also permits the second latch to move downwardly with respect to its Fig. 1 position and the first latch 28.

The first latch 28 includes the beveled surface 31 above referred to, this beveled surface normally lying in contact with a beveled surface 38 on the shutter-releasing member 39. This member may turn upon a pivot 40 and includes a power spring 126 which tends to turn member 39 in a counter-clockwise direction. When the beveled surfaces 31 and 38 engage, movement of the member 39 is prevented because the engagement of these surfaces is almost on dead centers between the studs 40 and 29 on which the power-operated member 39 and the first latch member turn. However, the trigger 6 can start movement of the first lever 28 which may then be completed by the power-operated member 39 in the following manner. The trigger 6 is pivoted on a stud 42 and is normally held by a spring 43 in the position shown in Fig. 1. The trigger member has an inverted L-shaped slot 44 and a lug 45 which lies above the first latch member 28.

When the trigger member 6 is depressed, this lug 45 engages and moves the lever 28 a distance insufficient to move the latch element 33 on the second latch 32 from the latch element 34 on the arm 7' of the blade ring. Thus, the trigger alone does not release the shutter but merely starts movement of the first latch member 28 which movement is continued by the power-operated member 39. As soon as the beveled surfaces 31 and 38 move some distance off center, the power-operated member 39 can then take over movement of the latch 28 moving the second-mentioned latch 32 downwardly until the face 33 slips off of the protuberance 34. As soon as this occurs, the spring 25 moves the blade ring 23 rapidly in a counter-clockwise direction, causing the blades to open and close the exposure aperture 3. Thus, the spring 25 acts directly on the blade ring and the usual master member is omitted so that the exposure can be made. I have found that it is possible to obtain an exposure of as high as 1/800th of a second with a shutter aperture of .770" with springs having identically the same properties as used on similar size shutters employing master members which would give a maximum exposure of 1/400th of a second.

The power-operated member 39 is also employed to operate a primary member of a flash-contact mechanism, only the principal elements of which, 115, 114, and 113, are illustrated herein (Fig. 10).

The power-operated member 39 is free to turn on its stud 40. This stud also pivotally supports bell crank 127, having on the other arm thereof a lug 128 extending upwardly into the slot 129 in power-operated member 39. Bell crank arm 127 lies in the path of pin 125 on the blade ring 23, Fig. 11, and is moved by it when the blade ring is set by handle 7.

Power-operated member 39 is connected to the bell crank by a powerful spring 126, Fig. 11, encircling stud 40 and engaging pin 116 and lug 128. This spring tends to move member 39 in the direction of the arrow, Fig. 1, but in this view, latch 28 with surface 31 engaging the beveled surface 38 prevents such movement.

There is a light spring 41 encircling stud 40 having one edge resting on the case and the other end lying directly beneath the arm of spring 126 lying against lug 128. This spring tends to turn members 39 and the bell crank in a clockwise direction when lug 128 contacts with the end of the slot 129, as shown in Fig. 7. Thus, the function is that with bell crank arm 127 held set as in Fig. 1, spring 126 exerts a torque on pin 116 which will overcome spring 41 as soon as movement of latch 28 has been moved a sufficient distance by the trigger for the power-operated member 39 to take over, at which time spring 126 will drive member 39 counter-clockwise and latch element 33 will release latch 34.

The blade ring 23 will then move in making an exposure and arm 127 will be released, moving lug 128 to the end of the slot 129 as shown in Fig. 7. When this position is reached, spring 41 can readily swing both the bell crank lever and member 39 clockwise, but arm 127 will still be across the path of pin 125 and the latch elements 31 and 38 become engaged, as shown in Fig. 8. Therefore, when handle 7 is moved to set the shutter, pin 125 again moves bell crank arm 127 to its Fig. 1 position, moving lug 128 to the end of slot 129, as therein shown, and simultaneously tensioning the spring 126 so that this spring is again set to drive member 39 in a counter-clockwise direction.

The pin 26 to which the spring 25 is attached can conveniently extend upwardly through a slot 50 in the mechanism plate 30 so that this pin may be used to produce slow, automatic exposures as, for instance, from 1/400th down to one second duration. While the mechanism for doing this forms no part of my present invention, it may consist of a gear segment 51 pivoted at 52 to the mechanism plate and having a cam arm 53 which can be made to lie at various angles across the slot 50 by moving the gear segment 51 by means of an upstanding pin 54. This can be done in a known manner by means of a cam ring 90 (Fig. 9) so pin 54 may ride on cam 91. The gear segment 51 carries teeth 55 meshing with a pinion 56 which forms a part of a known type of gear train. Thus, the retard may be of known type, although, of course, in the present instance, it acts directly upon a pin carried by the movably-mounted blade ring and not through intermediate parts and levers.

When an exposure of other than the highest speed is used, and particularly when prolonged automatic exposures are made, such as a one-second exposure, it is necessary to prevent the trigger member 6 from returning from its Fig. 7 to its Fig. 1 position before the exposure has been completed. For this reason, I provide a trigger lever 60 pivoted at 61 to the mechanism plate 30 and including two upstanding lugs 62 and 63. As indicated in Fig. 7, lug 62 may pass into the upper section of the slot 44 when the trigger is depressed and under the influence of a spring 65. This spring tends to turn the lever 60 in a clockwise direction and, when the trigger has been moved to its Fig. 7 position, it latches the trigger temporarily against a return movement. This latched position is maintained until the arm 7' of the blade ring moves to its Fig. 8 position in which an edge 66 of the arm strikes the upstanding lug 63, swinging the lever 60 about its pivot 61 and moving the upstanding lug 62 into the arcuate portion of the slot 44, thereby allowing the trigger to move outwardly and into its Figs. 1 and 8 positions. It will be noticed here again that the trigger latch acts directly on the trigger and not on an intermediate member.

Since I employ shutter blades 18 of the symmetrical type, it is obvious that these blades must open and close during the shutter-setting movement. Accordingly, it is necessary to prevent light from entering during this movement. To accomplish this, I provide a pair of cover blades 70 and 71, as shown in Fig. 6; these two cover blades being directly connected to the trigger 6 to be moved thereby in the following manner. The blades 70 and 71 are quite similar in shape, although one is right-hand and the other is left-hand. They lie in the space between the bottom 72 of the shutter casing and the mechanism plate 20 (Fig. 2) and they are directly connected to the trigger 6 by means of a pin 73 carried by the trigger passing downwardly through the slots 74 and 75 in the two blades, as best shown in Fig. 8. Each blade is pivoted to the shutter; blade 71 upon a pin 76 and 70 upon a pin 77, both of these pins being spaced to each side of the shutter trigger pin 73. Thus, when the shutter trigger is moved inwardly about its pivot 42, the pin 73 tends to pass between the two pivots 76 and 77, and the blades 70 and 71 are opened while the shutter trigger is moving the first latch element 28, as above described, and before the power-operated release 39 moves the second latch element 32 the final distance necessary to release the blade ring. Consequently, when the trigger 6 is depressed, the cover blades 70 and 71 are open and an exposure is made by movement of the main shutter blades 18. Since the trigger 6 is temporarily latched in the Fig. 7 position, the blades 70 and 71 cannot be closed until the exposure is completed and until the arm 7' strikes the upstanding lug 63 to move the latch lever 60 to release the trigger 6.

In order to produce a prolonged exposure, in which the trigger is depressed to release the blade ring to open the blades and is released to permit the blade ring to close the exposure aperture, I provide a bulb lever 80 pivoted on the stud 42 carried by the mechanism plate and including a tail 82 which can be moved into a position to intercept the protuberance 34 when the blade ring is moved to fully open the blades. This position of the bulb lever 80 is shown in Fig. 9. Lever 80 has an arm 83 pressed by spring 84 against cam 85. Consequently, when pointer P is moved to the position indicated by B (Fig. 3), the arm 83 lies in the notch 86 of cam 85 which is the only position in which the bulb lever is operative. When resting on the concentric portion 87 of cam 85, the bulb lever is held inoperative.

There is also a cam 88 which holds the upstanding flange 62 in an inoperative position to allow the trigger 6 to return at once to its Fig. 1 position after a bulb exposure is completed. Here again, the concentric portion 89 of cam 88 allows the trigger latch to function normally.

In Fig. 10, the synchronizing-adjusting ring 100 is shown. This is moved by the handle-pointer 10. A recess 101 in cam 102 allows lever 103 to be depressed and spring 104 to move to an operative position to be engaged by lug 34 to make a circuit when the blades 18 are wide open making an exposure. Such instantaneous flashes are generally made by vapor discharge flash tubes. Lever 103 carries an insulating pad 105 and holds the spring contact 104 in the inoperative position of Fig. 1, except when lug 106 lies in recess 101. In all other positions, cam 102 holds lever 103 in the Fig. 1 position.

To prevent making the circuit when setting the shutter, an insulated knob 110, carried by lever 32, contacts with and moves contact 104 to its inoperative position when the shutter is set for the instantaneous flash. However, if a slower synchronization is required, as for 5 or 20 millisecond delay flash lamps, pointer 10 is set to the appropriate place on scale 11 and this causes cam 112 to adjust arm 113 about its pivot 114 to vary the location of contact arm 115, with respect to stud 116 carried by the power-actuated shutter trigger releasing segment 39.

Contact arm 115 is connected to terminal plug 117 by an insulated wire 118. Spring contact 104 is connected to the same side of the terminal plug 117 by an insulated wire 120. The other side of plug 117 is grounded on the shutter casing in a known manner.

My improved shutter mechanism is direct acting in that many intermediate parts customarily used in shutters are omitted. Spring 25 acts directly on blade ring 23 through pin 25. No intermediate master member is used. Latch 33 directly engages arm 7' and extension on the blade ring 23. The latch 62 directly engages the trigger 6. All intermediate and unnecessary parts have been omitted, and, as a consequence, I have been able to produce high speed as well as the usual low speeds of exposure with a simple shutter structure of modest cost.

I claim:

1. In a camera shutter of the type including an apertured casing, shutter blades pivotally mounted to open and close the aperture, mechanism for operating the blades including a blade ring, and a trigger for releasing the mechanism blade ring and having a rest position, the combination with said mechanism including the blade ring, of a retard for producing automatic exposures of short duration, with means for setting the shutter for differently-timed exposures and bulb exposures, said means positioning said retard in or out of operative engagement with the mechanism blade ring for operating the blades, supplemental blades positioned to open and close the shutter aperture, means for operating said supplemental blades directly from the trigger to open the supplemental blades and a spring to close the supplementary blades in timed relation to the shutter blades, and means operable by the means for setting the mechanism including the blade ring for preventing the supplemental shutter blades from closing through movement of the trigger when the retard is in an operative position, said means comprising a latch movable to and from a position to hold said supplementary shutter blades open, said latch normally being engageable by the blade ring, and a latch-positioning device carried by the means for positioning the retard and having a position for bulb exposures in which the latch is held in an inoperative position with respect to the trigger whereby said trigger may move to its rest position.

2. In a camera shutter of the type including an apertured casing, a plurality of symmetrical-shaped blades pivotally mounted in the casing and adapted to open and close the apertured casing, the combination with said shutter blades, of a blade ring operably connected to each blade, a setting lever on the blade ring, a latch surface thereon, a spring attached to the blade ring and casing for moving the blade ring in one direction, a latch for holding the blade ring in a set position with the spring under tension and comprising a pivoted arm extending adjacent to the trigger, a second hinged latch movable with respect to the first latch and having a protuberance for engaging and limiting its movement relative to the first latch, the blade ring setting member engaging a latch surface on the second latch, and power-operated means releasable by the trigger for moving the second latch through the first latch to release the blade ring to make an exposure.

3. The camera shutter defined in claim 2 characterized by the second latch being normally spring-pressed from the first latch and being movable toward the first latch in setting the shutter.

4. The shutter defined in claim 2 characterized by the power-operated shutter release comprising two spring elements with a pin-and-slot connection therebetween, a spring for normally holding the pin in one end of the slot, one element engageable by the blade ring in setting and tensioning the spring by moving the pin to the other end of the slot while the other member is held against movement by the second latch element.

5. The shutter defined in claim 2 characterized by the power-operated shutter release including a pair of elements connected by a pin and slot, one carrying a lug to be engaged by the blade ring in setting and a spring normally holding the pin in one end of the slot to permit the spring to drive the power-operated element to release the shutter to make an exposure, a pin on the blade ring tensioning the spring each time the shutter is tensioned.

6. In a camera shutter of the type including an apertured casing, a plurality of symmetrical-shaped blades pivotally mounted in the casing and adapted to open and close the apertured casing, the combination with said shutter blades, of a blade ring operably connected to each blade, a setting lever on the blade ring, a latch surface thereon, a spring attached to the blade ring and casing for moving the blade ring in one direction, a latch for holding the blade ring in a set position with the spring under tension and comprising a pivoted arm extending adjacent to the trigger, a second hinged latch movable with respect to the first latch and having a protuberance for engaging and limiting its movement relative to the first latch, a blade ring setting member engaging latch surface on the second latch, and power-operated means, releasable by the trigger for moving the second latch through the first latch to release the blade ring to make an exposure, a spring-operated trigger latch, engaging surfaces on the trigger and trigger latch to normally hold the former in a fixed position with respect to the latter, and a protuberance carried by the trigger latch lying in the path of the blade ring to be moved thereby when the blade ring is moved to set the shutter.

7. The shutter defined in claim 2 characterized by the power-operated shutter release including a pair of elements connected by a pin and slot, one carrying a lug to be engaged by the blade ring in setting and a spring normally holding the pin in one end of the slot to permit the spring to drive the power-operated element to release the shutter to make an exposure, a pin on the blade ring tensioning the spring each time the shutter is tensioned, and a second spring for turning the pair of elements including the pin and slot to a position of rest when the blade ring moves to a position of rest after exposure.

8. The camera shutter defined in claim 2 characterized by the second latch being normally spring-pressed from the first latch and positioned to snap behind the latch surface of the setting lever to hold the same in set position.

9. The camera shutter defined in claim 2 characterized by the second latch being normally spring-pressed from the first latch and positioned to snap behind the latch surface of the setting lever to hold the same in set position without moving the first latch element, the power-operated means including a power spring and a speed-governing device.

10. The camera shutter defined in claim 2 characterized by the second latch being normally spring-pressed from the first latch and positioned to snap behind the latch surface of the setting lever to hold the same in set position without moving the first latch element, the power-operated means having a speed-governing device for controlling the speed of moving the first-mentioned latch.

11. In a camera shutter of the type including an apertured casing, a plurality of symmetrical-shaped blades pivotally mounted in the casing and adapted to open and close the apertured casing, the combination with said shutter blades, of a blade ring operably connected to each blade, a setting lever on the blade ring, a latch surface thereon, a spring attached to the blade ring and casing for moving the blade ring in one direction, a latch for holding the blade ring in a set position with the spring under tension and comprising a pivoted arm extending adjacent to the trigger, a second hinged latch movable with respect to the first latch and having a protuberance for engaging and limiting its movement relative to the first latch, a blade ring setting member engaging latch surface on the second latch, and power-operated means, releasable by the trigger for moving the second latch through the first latch to release the blade ring to make an exposure, and means operated by the last part of the setting movement of the blade ring for tensioning the power-operated means, to be released by the trigger for making an exposure.

12. In a camera shutter of the type including an apertured casing, a plurality of symmetrical-shaped blades pivotally mounted in the casing and adapted to open and close the aperture in the casing, the combination with said shutter blades, of a blade ring operably connected to each blade, a main drive spring connected to the blade ring and shutter casing, a blade ring latch for holding the spring under tension, a pin on the blade ring, a power-operated shutter release, a latch for the shutter release having engagement with the blade ring latch for actuating the latter to release the blade ring, said power-operated shutter release comprising two parts, one of which is a bell-crank lever having two arms, one lying across the path of movement of the pin on the blade ring, the other arm including a pin passing through a slot in the other of said two parts, a power spring tending to move one part relative to the other until limited by the pin and slot, said latch for the shutter release being adapted to hold the other of said two parts against movement while the bell-crank lever is moved by the blade ring pin in setting the shutter.

13. In a camera shutter of the type including an apertured casing, a plurality of symmetrical-shaped blades pivotally mounted in the casing and adapted to open and close the aperture in the casing, the combination with said shutter blades, of a blade ring operably connected to each blade, a main drive spring connected to the blade ring and shutter casing, a blade ring latch for holding the spring under tension, a pin on the blade ring, a power-operated shutter release, a latch for the shutter release having engagement with the blade ring latch for actuating the latter to release the blade ring, said power-operated shutter release comprising two parts, one of which is a bell-crank lever having two arms, one lying across the path of movement of the pin on the blade ring, the other arm including a pin passing through a slot in the other of said two parts, a power spring tending to move one part relative to the other until limited by the pin and slot, said latch for the shutter release being adapted to hold the other of said two parts against movement while the bell-crank lever is moved by the blade ring pin in setting the shutter, and a light spring adapted to move both of said two parts to a rest position when the blade ring pin moves out of engagement with the bell-crank lever arm and into a position where the other of said two parts may be held by its latch.

14. In a camera shutter of the type including an apertured casing, a plurality of symmetrical-shaped blades pivotally mounted in the casing and adapted to open and close the aperture in the casing, the combination with said shutter blades, of a blade ring operably connected to each blade, a main drive spring connected to the blade ring and shutter casing, a blade ring latch for holding the spring under tension, a pin on the blade ring, a power-operated shutter release, a latch for the shutter release having engagement with the blade ring latch for actuating the latter to release the blade ring, said power-operated shutter release comprising two parts coaxially pivoted and having means for limiting the movement between the parts, a power spring normally holding the parts at one extreme of their movement, and means for setting the power spring including latching one part against movement while said means moves the other part to tension said power spring.

15. In a camera shutter of the type including an apertured casing, a plurality of symmetrical-shaped blades pivotally mounted in the casing and adapted to open and close the aperture in the casing, the combination with said shutter blades, of a blade ring operably connected to each blade, a main drive spring connected to the blade ring and shutter casing, a blade ring latch for holding the spring under tension, a pin on the blade ring, a power-operated shutter release, a latch for the shutter release having engagement with the blade ring latch for actuating the latter to release the blade ring, said power-operated shutter release comprising two parts coaxially pivoted and having means for limiting the movement between the parts, a power spring normally holding the parts at one extreme of their movement, and means for setting the power spring including latching one part against movement while said means moves the other part to tension said power spring, and a light spring for moving both parts together to a rest position in which the latch for holding one part against movement may function.

16. In a shutter for cameras of the type including a set of double-ended shutter blades moving in one direction for opening and closing an exposure opening, the combination with a trigger movably carried by the casing, a pair of cover blades movably carried by the casing, a direct connection between the trigger and cover blades for operating the latter by the former, a spring-driven shutter release, a latch for holding the spring-driven shutter release inoperable, said latch being movable by the trigger through a limited extent to a position in which it may be moved by the spring-driven shutter release, a blade ring connected to the double-ended shutter blades, a driving spring directly connected thereto, and a lug engageable with the latch to hold the blade ring against movement, the connections between the trigger and cover blades moving the blades to open the exposure aperture before the shutter is released by the spring-driven shutter release.

17. A camera shutter of the type having a casing, an exposure aperture therein and double-ended blades pivotally mounted in the shutter for opening and closing the exposure aperture through movement in one direction, said shutter including a blade ring movably mounted on the shutter and connected to each double-ended shutter blade, a power spring attached to the blade ring and shutter casing for moving the blade ring, a handle on the blade ring for setting the spring, a latch for holding the set spring against movement, a trigger for moving the latch only an insufficient distance to trip the latch, a spring-driven shutter release for moving the latch to trip the shutter only after the release has been first moved by the trigger whereby an exposure may be made.

CARL C. FUERST.

REFERENCES CITED

The following references are of record in the file of this patent:

UNITED STATES PATENTS

| Number | Name | Date |
|---|---|---|
| 2,231,094 | Seifert | Feb. 11, 1941 |
| 2,232,969 | Ranft | Feb. 25, 1941 |
| 2,267,518 | Burger | Dec. 23, 1941 |
| 2,326,077 | Steiner | Aug. 3, 1943 |
| 2,344,382 | Aiken | Mar. 14, 1944 |